United States Patent
Dave et al.

(10) Patent No.: US 10,173,943 B2
(45) Date of Patent: *Jan. 8, 2019

(54) NON-CORROSIVE NITRIFICATION INHIBITOR POLAR SOLVENT FORMULATION

(71) Applicants: DOW AGROSCIENCES LLC, Indianapolis, IN (US); RHODIA OPERATIONS, Paris (FR)

(72) Inventors: Hiteshkumar Dave, Carmel, IN (US); Lei Liu, Carmel, IN (US); Alex Williams, Indianapolis, IN (US); Rajesh Goyal, Bensalem, PA (US); Nicholas Fradette, Verona, NJ (US); Chloe Moreau, Pessac (FR); Samantha Armisen, Villenave d'Ornon (FR); Kevin Mayer, Quakertown, PA (US)

(73) Assignee: Dow Agrosciences, LLC, Indianapolis, IN (US)

( * ) Notice: Subject to any disclaimer, the term of this patent is extended or adjusted under 35 U.S.C. 154(b) by 151 days.

This patent is subject to a terminal disclaimer.

(21) Appl. No.: 15/152,426

(22) Filed: May 11, 2016

(65) Prior Publication Data

US 2016/0332931 A1    Nov. 17, 2016

Related U.S. Application Data

(60) Provisional application No. 62/159,884, filed on May 11, 2015, provisional application No. 62/159,885, filed on May 11, 2015, provisional application No. 62/244,901, filed on Oct. 22, 2015, provisional application No. 62/244,902, filed on Oct. 22, 2015, provisional application No. 62/244,903, filed on Oct. 22, 2015.

(51) Int. Cl.
*C05G 3/08*   (2006.01)
*C05G 3/00*   (2006.01)
*C05C 11/00*  (2006.01)

(52) U.S. Cl.
CPC ............ *C05G 3/08* (2013.01); *C05C 11/00* (2013.01); *C05G 3/00* (2013.01); *C05G 3/0064* (2013.01); *Y02P 60/218* (2015.11)

(58) Field of Classification Search
CPC ......... C05G 3/08; C05G 3/0064; C05G 3/00; C05C 11/00; Y02P 60/218
See application file for complete search history.

(56) References Cited

U.S. PATENT DOCUMENTS

| | | | |
|---|---|---|---|
| 3,135,594 A | 6/1964 | Goring | |
| 3,922,383 A * | 11/1975 | Wilks | B05D 5/12 252/506 |
| 4,746,513 A | 5/1988 | Smith | |
| 5,925,464 A | 7/1999 | Mulqueen et al. | |
| 7,300,907 B2 | 11/2007 | Epp et al. | |
| 7,314,849 B2 | 1/2008 | Balko et al. | |
| 7,642,220 B2 | 1/2010 | Epp et al. | |
| 7,786,044 B2 | 8/2010 | Epp et al. | |
| 8,956,996 B2 | 2/2015 | Gewehr et al. | |
| 2009/0007616 A1 | 1/2009 | Bureman et al. | |
| 2010/0300694 A1 | 12/2010 | Vonderhagen et al. | |
| 2011/0098178 A1 | 4/2011 | Stock et al. | |
| 2012/0252668 A1 * | 10/2012 | Gewehr | A01N 25/00 504/101 |
| 2014/0329678 A1 | 11/2014 | Boucher, Jr. et al. | |

FOREIGN PATENT DOCUMENTS

CN     104152003 A  *  11/2014

OTHER PUBLICATIONS

PCT Search Report & Written Opinion (PCT/US2016/044484), dated Oct. 7, 2016.

* cited by examiner

*Primary Examiner* — Jennifer A Smith

(57) ABSTRACT

This invention relates to stable liquid formulations of the nitrification inhibitor nitrapyrin comprising polar solvents that are stabilized with small amounts of compounds which help to reduce the tendency of polar solutions of nitrapyrin to corrode metal surfaces. Many of the formulations disclosed herein exhibit useful physical, chemical, and bioactive properties including reduced levels of corrosion when in contact with ferrous metals.

17 Claims, No Drawings

NON-CORROSIVE NITRIFICATION INHIBITOR POLAR SOLVENT FORMULATION

RELATED APPLICATIONS

This application claims benefit of U.S. Ser. No. 62/159,884 filed May 11, 2015; U.S. Ser. No. 62/159,885, filed May 11, 2015; U.S. Ser. No. 62/244,901, filed Oct. 22, 2015; U.S. Ser. No. 62/244,902, filed Oct. 22, 2015; and U.S. Ser. No. 62/244,903, filed Oct. 22, 2015, the entire contents of which are incorporated herein by reference.

FIELD OF THE INVENTION

The present invention relates to relatively non-corrosive, high load nitrapyrin liquid formulations, comprising polar solvents and novel metal corrosion inhibitors and method of preparing and using the same.

BACKGROUND AND SUMMARY (Trichloromethyl)pyridine compounds, such as nitrapyrin (2-chloro-6-(trichloromethyl)pyridine), inhibit the process of nitrification and have been or are currently used in combination with nitrogen based fertilizers as described in U.S. Pat. No. 3,135,594, which is herein incorporated by reference. The application of these compounds helps to maintain levels of ammonium nitrogen applied to the soil in the ammonium form (plant accessible stabilized nitrogen); higher levels of plant accessible nitrogen in the soil enhances crop performance and can increase crop yields.

Due to their volatile nature some formulations of nitrapyrin, also referred to herein as liquid inhibitior compositions, are best applied by incorporating them mechanically into the soil, or by watering them into the soil within about 8 hours after applying them to the surface of the soil. Some encapsulated formulations of nitrapyrin are suitable for rapid or dump release of nitrapyrin into the soil. Some formulations of nitrapyrin encapsulated with lignin sulfonates, especially useful for quick release applications, are disclosed in U.S. Pat. No. 4,746,513, which is incorporated herein by reference. Polycondensation encapsulation, as disclosed in U.S. Pat. No. 5,925,464, has also been used to encapsulate agriculturally active ingredients such as nitrapyrin, particularly to enhance handling safety and storage stability of the active ingredient by using polyurethane rather than polyurea encapsulants.

Encapsulated nitrapyrin formulations exhibit certain advantages over liquid non-encapsulated formulations of nitrapyrin, such as improved stability. Despite the advantages of encapsulated nitrapyrin formulations, liquid non-encapsulated formulations of nitrapyrin are still used, at least in part, because they tend to be easier to formulate and may cost less than encapsulated nitrapyrin formulations. As with most any soil amendment there is an advantage to using formulations that include a high level of the agriculturally active component of the formulation. Formulations that have higher levels of an active ingredient generally mean that less material must be moved, stored, and applied to the field; the net result is that these formulations may exhibit lower material handling costs.

In most commercially available liquid formulations the level of nitrapyrin has been limited by the need to pair nitrapyrin with relatively non-corrosive solvents. Some aspects of the present invention provide a liquid formulation of nitrapyrin (i.e., a liquid inhibitor composition) that includes a relatively high level of nitrapyrin. In these inventive formulations nitrapyrin is present in polar solvents and is especially formulated to be non-corrosive or at least less corrosive than previous formulations of nitrapyrin that included significant levels of polar solvents. Dibasic ester, as used herein, refers to a compound containing two ester groups. Examples of dibasic esters include, but are not limited to, dimethyl glutarate, dimethyl succinate, dimethyl adipate, dimethyl 2-methylglutarate, and mixtures thereof.

Some embodiments include a liquid formulation of nitrapyrin comprising of: nitrapyrin, at least one polar solvent selected from the group consisting of: (1) N,N-dialkyl fatty acid amides such as those found in products such as, but not limited to, di-substituted amides including for example N,N-di-methyloctanamide (N,N-dimethylcarpryl-amide) and N,N-dimethyldecanamide (N,N-dimethylcapr-amide), compounds sold under the trade names, Hallcomid M810, Hallcomid M10, still other compounds that can be used in capacity include, for example, Rhodiasolv® ADMA 810, Rhodiasolv® ADMA 10, Genagen 4166 and Genagen 4296; (2) cyclohexanone; (3) dibasic esters such as, but not limited to, dimethyl 2-methylglutarate, which is available as Rhodiasolv® IRIS, and a dibasic ester mixture composed of dimethyl glutarate, dimethyl succinate, and dimethyl adipate which is available as Rhodiasolv® RPDE; (4) glycol ethers and polyalkylene diglycol ethers such as, but not limited to, dipropylene glycol methyl ether which is available as Dowanol™ DPM; (5) alkylene carbonates such as, but not limited to, propylene carbonate which is available as Jeffsol AG 1555; (6) methyl-5-(dimethylamino)-2-methyl-5-oxopentanoate which is available as Rhodiasolv® Polarclean; (7) organophosphate compounds such as, but not limited to, trialkyl phosphates, (8) alkoxybenzene compounds such as, but not limited to, methoxybenzene (anisole) and ethoxybenzene, (9) ketones such as, but not limited to, cyclopentanone and cyclohexanone, and at least one inhibitor of metal corrosion. The liquid formulations of the present invention may include high levels of nitrapyrin and exhibit relatively non-corrosive properties, making them suitable for use with metal objects such as metal storage tanks and metal application equipment.

In one embodiment, the corrosion inhibitor is selected from the group consisting of: nicotinamide, a picoline, 2,6 lutidine, expoxidized linseed oil (ELO) and DER 331 liquid epoxy resin.

In one embodiment, the corrosion inhibitor is niacin, also known as nicotinic acid. In another embodiment, the corrosion inhibitor is a niacin-derivative. In yet another embodiment, the corrosion inhibitor is niacinamide (it is understood that the terms "niacinamide" and "nicotinamide" are synonymous), methyl isonicotinate, niacin esters, acipimox, aluminum nicotinate, niceritrol, nicoclonate, nicomol, inositol hexaniacinate, oxiniacic acid or combinations thereof.

Non-limiting examples of niacin derivatives include methyl isonicotinate, niacin esters, niacinamide salicylate, niacinamide ascorbate, niacinamide folate, niacinamide lipoate, niacinamide lactate, niacinamide glycolate, niacinamide mandalate, niacinamide malate, niacinamide hydroxycitrate, niacinamide hydroxytetronate, niacinamide aleurate, niacinamide petroselinate, niacinamide pantothenate, niacinamide adenosine monophosphate (AMP), niacinamide diphosphate (ADP), niacinamide adenosine triphosphate (ATP), niacinamide hydroquinone carboxylate, nicotinic acid, niacinamide, Acipimox (5-methylpyrazinecarboxylic acid, 4-oxide), aluminum nicotinate, Niceritrol (3-pyridinecarboxylic acid 2,2-bis [[3-pyridinylcarbonyl]oxy]methyl)-1,3-propanediyl ester, Nicoclonate, Nicomol (2,2,6,6-(1- hydroxycyclohexyl) tetramethyltetrakis (3-pyridinecarboxylate), inositol hexaniacinate, and Oxiniacic Acid (3-pyridinecarboxylic acid, 1-oxide.

In another embodiment, the corrosion inhibitor is derivatized linseed oil, including, but not limited to, epoxidized linseed oil. In another embodiment, the corrosion inhibitor is 1,2-epoxydecane. In another embodiment, the corrosion is an amino alcohol, for example, 2-amino-2-methyl-1-propanol (i.e., AMP-95 or AMP-99). In another embodiment, the corrosion inhibitor is an imidazole compound, for example, 1-methyl imidazole. In another embodiment, the polar solvent is diethylene glycol butyl ether (DGBE). In another embodiment, the corrosion inhibitor and/or co-solvent is an esteramide compound.

In yet another embodiment, the corrosion inhibitor is selected from niacinamide, methyl isonicotinate, niacin esters, acipimox, aluminum nicotinate, niceritrol, nicoclonate, nicomol, inositol hexaniacinate, oxiniacic acid, linseed oil or derivatized linseed oil, including but not limited to epoxidized linseed oil, 1,2-epoxydecane, an amino alcohol, for example, 2-amino-2-methyl-1-propanol, 1-methyl imidazole, a quinolone compound such as quinaldine, or any combination thereof.

In another aspect, described herein are liquid fertilizer compositions for use in agricultural applications comprising: one more nitrogenous fertilizer compounds; at least one nitrification inhibitor comprising a (trichloromethyl)pyridine compound; a polar solvent; and, optionally, a corrosion inhibitor.

In one embodiment, the liquid inhibitor composition or liquid fertilizer composition further comprises at least one additional component including, but not limited to, a co-solvent, a pH adjustor, flow agents, preservatives, buffering agents, antifoam agents, compatibility agents, deposition agents, dispersants, drift control agents, penetrants, surfactants, spreaders, and wetting agents, and the like. In one embodiment, the nitrogenous fertilizer compound is anhydrous ammonia.

Polar solvents that can be used to practice some embodiment of the invention include, but are not limited to, cyclohexanone, propylene carbonate, N,N-dialkyl fatty acid amides: specifically the mixture of C8/C10 fatty acid N,N-dimethylamides (Hallcomid M810), other fatty acid amides also C8 & C10 N,N-dimethylamides individually, the dibasic ester mixture composed of dimethyl glutarate, dimethyl succinate, and dimethyl adipate, which is available as Rhodiasolv® RPDE, organophosphate compounds which are trialkyl phosphates, and alkoxybenzene compounds such as methoxybenzene (anisole) and ethoxybenzene. In one embodiment, the organophosphate compound may be selected from the group including triethyl phosphate, tri(isobutyl)phosphate, tributoxyethyl phosphate (TBEP) and tris(2-ethylhexyl) phosphate. In one embodiment, the polar solvent is comprised of the dibasic ester mixture composed of dimethyl glutarate, dimethyl succinate, and dimethyl adipate (Rhodiasolv® RPDE) and cyclohexanone. In one embodiment, the alkoxybenzene compound is methoxybenzene (anisole). In one embodiment, the organophosphate compound is triethyl phosphate.

Polar solvents that have not worked in some of the exemplary formulation disclosed herein include; (1) dipropylene glycol monomethyl ether (Dowanol DPM), (2) methyl-5-(dimethylamino)-2-methyl-5-oxopentanoate (Polarclean), solvent mixture composed of reaction mass of dimethyl glutarate, dimethyl succinate, and dimethyl adipate (Rhodiasolv® RPDE), and N-butylpyrrolidone (TamiSolve NxG).

Corrosion inhibitors that may not be well suited, or even efficacious, for the practice of the instant invention include, methyltrioctyl ammonium chloride, poly(12-hydroxyoctadecanoic acid-co-ethylenimine) (e.g., Atlox LP6).

Corrosion inhibitors that may be used to practice some embodiments of the invention include, for example, pyridinecarboxamides (i.e., nicotinamide or niacinamide), methylpyridines (i.e., α-picoline, 2,6 lutidine), epoxidized seed or vegetable oils (i.e., epoxidized linseed oil (ELO), epoxidized soybean oil, etc.) and epoxy resin (liquid reaction product of epichlorohydrin and bisphenol, such as, D.E.R.™ 331™ liquid epoxy resin (DER 331)).

Molecules of the following formulas reduce and/or protect against metal corrosion caused by certain nitrification inhibitors including those disclosed herein, these molecules include:

(1) methylpyridines:

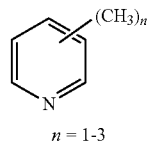

$n = 1-3$ (2) pyridine carboxamides:

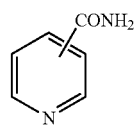

(3) pyridine carboxylic acid and esters:

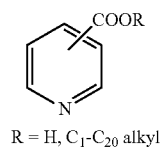

$R = H, C_1-C_{20}$ alkyl (4) epoxidized seed or vegetable oils:

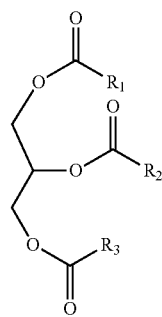

wherein $R_1$, $R_2$, and $R_3$ independently represent $C_{14}$-$C_{20}$ alkyl groups substituted with from zero to four epoxide groups;

(5) an epoxy resin based on bisphenol-type chemistry:

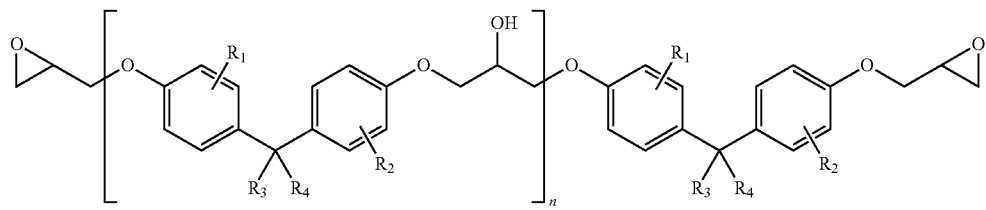

wherein $R_1$ and $R_2$ independently represent H, $C_1$-$C_4$ alkyl, or phenyl, and $R_3$ and $R_4$ independently represent H, $C_1$-$C_4$ alkyl, $C_1$-$C_4$ haloalkyl, or phenyl;

(6) 1,2-epoxyalkanes:

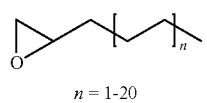

$n = 1$-$20$ (7) 1-alkylimidazoles:

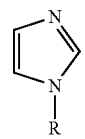

$R = C_1$-$C_{20}$ alkyl (8) amine salts of nicotinic acid:

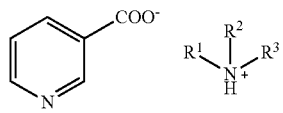

wherein $R^1$, $R^2$ and $R^3$ independently represent H, ($C_1$-$C_{18}$) alkyl or ($C_1$-$C_{18}$) alkyl substituted with one or more substituents selected from, but not limited to, halogen, hydroxy, alkoxy or alkylthio, provided that the substituents are sterically compatible and the rules of chemical bonding and strain energy are satisfied, or any two of $R^1$, $R^2$ and $R^3$ represent —$(CH_2)_n$— where n is an integer from 3-5.

(9) primary, secondary & tertiary amines:

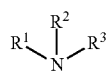

wherein $R^1$, $R^2$ and $R^3$ independently represent H, ($C_1$-$C_{18}$) alkyl or ($C_1$-$C_{18}$) alkyl substituted with one or more substituents selected from, but not limited to, halogen, hydroxy, alkoxy or alkylthio, provided that the substituents are sterically compatible and the rules of chemical bonding and strain energy are satisfied, or any two of $R^1$, $R^2$ and $R^3$ represent —$(CH_2)_n$— where n is an integer from 3-5;

(10) tertiary amine oxides:

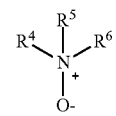

wherein $R^4$, $R^5$ and $R^6$ independently represent ($C_1$-$C_{18}$) alkyl or ($C_1$-$C_{18}$) alkyl substituted with one or more substituents selected from, but not limited to, halogen, hydroxy, alkoxy or alkylthio, provided that the substituents are sterically compatible and the rules of chemical bonding and strain energy are satisfied, or any two of $R^1$, $R^2$ and $R^3$ represent —$(CH_2)_n$— where n is an integer from 3-5, or wherein $R^4$ is a straight or branched chain ($C_1$-$C_{18}$) alkyl or an alkyletherpropyl or alkylamidopropyl of the formula:

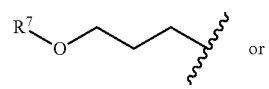

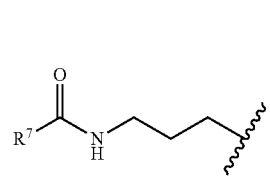

wherein $R^7$ is a straight or branched chain ($C_{10}$-$C_{18}$) alkyl, and $R^5$ and $R^6$ independently are straight or branched chain ($C_1$-$C_{18}$) alkyl or ethoxylates or propoxylates of the formula:

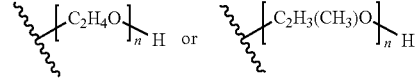

wherein n is an integer from 1 to 20;
(11) tetra-substituted ammonium salts:

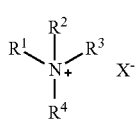

wherein $R^1$, $R^2$ and $R^3$ independently represents $(C_1-C_{16})$ alkyl or $(C_1-C_{18})$ alkyl substituted with one or more substituents selected from, but not limited to, halogen, hydroxy, alkoxy or alkylthio, provided that the substituents are sterically compatible and the rules of chemical bonding and strain energy are satisfied, or any two of $R^1$, $R^2$ and $R^3$ represent —$(CH_2)_n$— where n is an integer from 3-5, $R^4$ represents (($C_1-C_{16}$) alkyl or arylalkyl), and $X^-$ is selected from, but not limited to, chloride, bromide, or iodide;
and mixtures thereof.

A first set of embodiments includes a composition comprising an inhibitor of nitrification; at least one polar solvent miscible corrosion inhibitor; a first solvent, wherein said first solvent is a polar solvent which readily dissolves the nitrification inhibitor; and an optional second solvent, the optional second solvent is miscible in the first solvent and wherein the second solvent is no more polar than the first solvent, in some of these embodiments the inhibitor of nitrification is a (trichloromethyl) pyridine compound such as nitrapyrin (2-chloro-6-(trichloromethyl)pyridine.

A second set of embodiments is provided according to the first set of embodiments wherein the at least one polar solvent miscible corrosion inhibitor is selected from the group consisting of:

(1) methylpyridines:

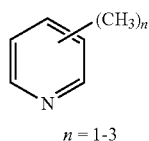

$n = 1-3$ (2) pyridine carboxamides:

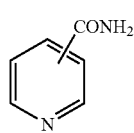

(e.g., nicotinamide and isomers thereof)

(3) pyridine carboxylic acid and esters:

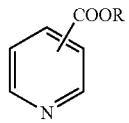

R = H, $C_1$-$C_{10}$ alkyl (e.g., nicotinic acid, nicotinate esters, and isomers thereof)
(4) epoxidized seed or vegetable oils:

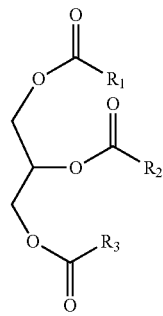

wherein $R_1$, $R_2$, and $R_3$ independently represent $C_{14}$-$C_{20}$ alkyl groups substituted with from zero to four epoxide groups.

(5) epoxy resin (based on bisphenol-type chemistry)

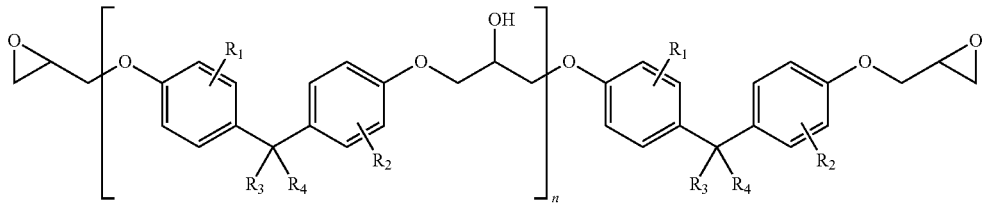

wherein $R_1$ and $R_2$ independently represent H, $C_1$-$C_4$ alkyl, or phenyl, and $R_3$ and $R_4$ independently represent H, C1-C4 alkyl, C1-C4 haloalkyl, or phenyl.

(6) 1,2-epoxyalkanes:

(e.g., 1,2-epoxydecane)

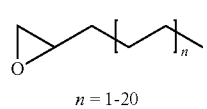

$n = 1-20$ (7) 1-alkylimidazoles:

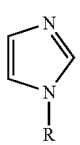

R = $C_1$-$C_{20}$ alkyl (8) amine salts of nicotinic acid:

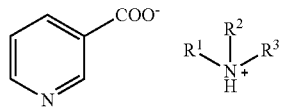

wherein $R^1$, $R^2$ and $R^3$ independently represent H, $(C_1$-$C_{18})$ alkyl or $(C_1$-$C_{18})$ alkyl substituted with one or more substituents selected from, but not limited to, halogen, hydroxy, alkoxy or alkylthio, provided that the substituents are sterically compatible and the rules of chemical bonding and strain energy are satisfied, or any two of R1, R2 and R3 represent —(CH2)n- where n is an integer from 3-5.

(9) primary, secondary & tertiary amines:

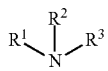

wherein $R^1$, $R^2$ and $R^3$ independently represent H, $(C_1$-$C_{18})$ alkyl or $(C_1$-$C_{18})$ alkyl substituted with one or more substituents selected from, but not limited to, halogen, hydroxy, alkoxy or alkylthio, provided that the substituents are sterically compatible and the rules of chemical bonding and strain energy are satisfied, or any two of $R^1$, $R^2$ and $R^3$ represent —$(CH_2)_n$— where n is an integer from 3-5.

(10) tertiary amine oxides:

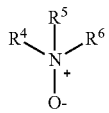

wherein $R^4$, $R^5$ and $R^6$ independently represent $(C_1$-$C_{18})$ alkyl or $(C_1$-$C_{18})$ alkyl substituted with one or more substituents selected from, but not limited to, halogen, hydroxy, alkoxy or alkylthio, provided that the substituents are sterically compatible and the rules of chemical bonding and strain energy are satisfied, or any two of $R^1$, $R^2$ and $R^3$ represent —$(CH_2)_n$— where n is an integer from 3-5, or
wherein $R^4$ is a straight or branched chain $(C_1$-$C_{18})$ alkyl or an alkyletherpropyl or alkylamidopropyl of the formula:

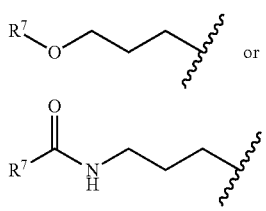

wherein $R^7$ is a straight or branched chain $(C_{10}$-$C_{18})$ alkyl, and
$R^5$ and $R^6$ independently are straight or branched chain $(C_1$-$C_{18})$ alkyl or ethoxylates or propoxylates of the formula:

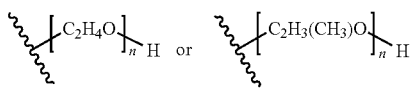

wherein n is an integer from 1 to 20, or mixtures thereof.

(11) tetra-substituted ammonium salts:

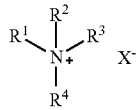

wherein $R^1$, $R^2$ and $R^3$ independently represents $(C_1$-$C_{16})$ alkyl or $(C_1$-$C_{18})$ alkyl substituted with one or more substituents selected from, but not limited to, halogen, hydroxy, alkoxy or alkylthio, provided that the substituents are sterically compatible and the rules of chemical bonding and strain energy are satisfied, or any two of $R^1$, $R^2$ and $R^3$ represent —$(CH_2)_n$— where n is an integer from 3-5, $R^4$ represents $((C_1$-$C_{16})$ alkyl or arylalkyl), and $X^-$ is selected from, but not limited to, chloride, bromide, or iodide. In some embodiments, N—$((C_1$-$C_{16})$ alkyl or arylalkyl) tri $((C_1$-$C_{16})$ alkyl)ammonium salts are those in which $R^1$, $R^2$, $R^3$ and $R^4$ are the same or where $R^1$, $R^2$ and $R^3$ are $CH_3$ and $R^4$ is $(C_2$-$C_{16})$ alkyl or arylalkyl.

A third set of embodiments includes a formulation, comprising: 2-chloro-6-(trichloromethyl)pyridine, wherein the 2-chloro-6 (trichloromethyl)pyridine is present in the formulation in the range of about 200 to about 400 g/L; at least one polar solvent, selected from the group consisting of: a mixture of N,N-dimethyloctanamide (N,N-dimethylcaprylamide) and N,N-dimethyldecanamide (N,N-dimethylcapramide); and a dibasic ester, wherein the first solvent comprises between about 40 to about 70 weight percent of the formulation; at least one polar solvent miscible corrosion inhibitor, selected from the group consisting of: a liquid epoxy resin; 2,6-dimethylpyridine; epoxidized linseed oil; and nicotinamide; wherein each said polar solvent miscible corrosion inhibitor, comprises about 0.5 to about 2.5 weight percent; and at least one optional solvent selected from the group consisting of: a solvent naphtha, wherein the second solvent comprises about 5.0 to about 20.0 weight percent of the formulation.

A fourth set of embodiments includes a formulation comprising: about 240 to about 350 g/L of 2-chloro-6-(trichloromethyl)pyridine; about 40 to about 60 weight percent of a mixture of N,N-dimethyloctanamide (N,N-dimethylcaprylamide) and N,N-dimethyldecanamide (N,N-dimethylcapramide); about 0.5 to about 1.5 weight percent of liquid epoxy resin and about 0.5 to about 1.5 weight percent 2,6-dimethylpyridine; and about 5 to about 20 weight percent solvent naphtha.

A fifth set of embodiments includes a formulation comprising: about 230 to about 300 g/L of 2-chloro-6-(trichloromethyl)pyridine; about 45 to about 55 weight percent of a mixture of N,N-dimethyloctanamide (N,N-dimethylcaprylamide) and N,N-dimethyldecanamide (N,N-dimethylcapramide); about 0.75 to about 1.4 weight percent of liquid epoxy resin; about 0.5 to about 1.5 weight percent 2,6-dimethylpyridine; and about 10 to about 15 weight percent solvent naphtha.

A sixth set of embodiments includes a formulation comprising: about 240 g/L of 2-chloro-6-(trichloromethyl)pyridine; about 50.0 to about 55 weight percent of a mixture of N,N-dimethyloctanamide (N,N-dimethylcaprylamide) and N,N-dimethyldecanamide (N,N-dimethylcapramide); about 1.0 to about 1.1 weight percent of liquid epoxy resin oil; about 0.5 to about 1.5 weight percent 2,6-dimethylpyridine; and about 11.0 to about 14.0 weight percent solvent naphtha.

A seventh set of embodiments includes a formulation comprising: about 240 g/L of 2-chloro-6-(trichloromethyl)pyridine; about 50.55 weight percent of a mixture of N,N-dimethyloctanamide (N,N-dimethylcaprylamide) and N,N-dimethyldecanamide (N,N-dimethylcapramide); about 1.2 weight percent of liquid epoxy resin oil; about 0.5 to about 1.5 weight percent 2,6-dimethylpyridine; and about 12.64 weight percent solvent naphtha.

An eighth set of embodiments includes a formulation comprising: about 200 to about 400 g/L of 2-chloro-6-(trichloromethyl)pyridine; about 20 to about 50 weight percent of a dibasic ester; about 0.5 to about 2.5 weight percent of epoxidized linseed oil; about 0.5 to about 2.5 weight percent nicotinamide; and about 20.0 to about 50.0 weight percent cyclohexanone.

A ninth set of embodiments includes a formulation comprising: about 240 g/L to about 350 g/L of 2-chloro-6-(trichloromethyl)pyridine; about 45 to about 55 weight percent of a dibasic ester; about 1.0 to about 2.0 weight percent of epoxidized linseed oil; and about 0.8 weight percent nicotinamide; and about 11.0 to about 14.0 weight percent cyclohexanone.

A tenth set of embodiments includes a formulation comprising: about 240 g/L of 2-chloro-6-(trichloromethyl)pyridine; about 50.47 weight percent of a dibasic ester; about 1.5 weight percent of epoxidized linseed oil; about 0.8 weight percent nicotinamide; and about 12.62 weight percent cyclohexanone.

A twelfth set of embodiments includes a formulation, comprising: about 200 to about 400 g/L of 2-chloro-6-(trichloromethyl)pyridine; about 40 to about 60 weight percent of a dibasic ester; about 0.5 to about 2.5 weight percent of epoxidized linseed oil; and about 0.4 to about 1.5 weight percent nicotinamide.

A thirteenth set of embodiments include the twelfth embodiment: about 240 g/L of 2-chloro-6-(trichloromethyl)pyridine; about 63.08 weight percent of a dibasic ester; about 1.5 weight percent of epoxidized linseed oil; and about 0.6 to about 1.0 weight percent nicotinamide.

A fourteenth set of embodiments include a formulation, comprising: about 240 g/L of 2-chloro-6-(trichloromethyl)pyridine; about 63.08 weight percent of a dibasic ester; about 1.5 weight percent of epoxidized linseed oil; and about 0.8 weight percent nicotinamide.

A fifteenth set of embodiments includes a formulation, comprising: about 200 to about 400 g/L of 2-chloro-6-(trichloromethyl)pyridine; about 40 to about 70 weight percent of triethyl phosphate; about 0.5 to about 2.5 weight percent of epoxidized linseed oil; and about 0.5 to about 2.5 weight percent of methyl nicotinate.

A sixteenth set of embodiments includes a formulation, comprising: about 200 to about 400 g/L of 2-chloro-6-(trichloromethyl)pyridine; about 40 to about 70 weight percent of methoxybenzene; about 0.5 to about 2.5 weight percent of nicotinamide; and about 0.5 to about 2.5 weight percent of 2-amino-2-methyl-1-propanol.

A seventeenth set of embodiments including at least one of the formulations according to any of the first through the sixteenth set of embodiments and at least additional agricultural ingredient selected from the group consisting of: herbicides, insecticides, mitocides, fungicides, and fertilizers.

An eighteenth set of embodiments including any of the formulations according to the seventeenth set of embodiments, wherein the agricultural ingredient is a fertilizer.

A nineteenth set of embodiments including any of the formulation according to the eighteenth set of embodiments, wherein the fertilizer includes nitrogen.

A twentieth set of embodiments including methods for treating soil, comprising the steps of: applying at least one of the formulations according to the first through the nineteenth set embodiments to at least one area selected from the area consisting of: the surface of a portion of soil, beneath the surface of a portion of soil, a portion of a plant, and a portion of a surface adjacent to a plant.

A twenty-first set of embodiments including any of the methods according to the twentieth set of embodiments, wherein the applying step includes injecting at least one of the formulations into a portion of soil.

DETAILED DESCRIPTION

For the purposes of promoting an understanding of the principles of the novel technology, reference will now be made to the preferred embodiments thereof, and specific language will be used to describe the same. It will nevertheless be understood that no limitation of the scope of the novel technology is thereby intended, such alterations, modifications, and further applications of the principles of the novel technology being contemplated as would normally occur to one skilled in the art to which the novel technology relates are within the scope of this disclosure and the claims.

Unless noted otherwise as used herein the term 'about' refers to a range of values from less than 10 percent to greater than 10 percent of the stated value, for example about 1.0 encompasses values from 0.9 to 1.1.

(Trichloromethyl)pyridine compounds useful in the composition of the present invention include compounds having a pyridine ring which is substituted with at least one trichloromethyl group and mineral acid salts thereof. The presence of a (trichloromethyl)pyridine compound suppresses the nitrification of ammonium nitrogen in the soil or growth medium, thereby preventing the rapid loss of ammonium nitrogen originating from nitrogen fertilizers, organic nitrogen constituents, or organic fertilizers and the like. Suitable compounds include those containing chlorine or methyl substituents on the pyridine ring in addition to a trichloromethyl group, and are inclusive of chlorination products of methyl pyridines such as the lutidines, the collidines and the picolines. Suitable mineral acid salts of the (trichloromethyl)pyridine compounds include hydrochlorides, nitrates, sulfates and phosphates.

The (trichloromethyl)pyridine compounds useful in the practice of the present invention are typically oily liquids or crystalline solids dissolved in a solvent. Other suitable compounds are described in U.S. Pat. No. 3,135,594. A preferred (trichloromethyl)pyridine is 2-chloro-6-(trichloromethyl)pyridine, also known as nitrapyrin, and the active ingredient of the product N-SERVE™ (Trademark of Dow AgroSciences LLC).

N-SERVE™ has an active nitrapyrin loading level of about 240 g/L. The nitrapyrin loading level of N-SERVE™ is set in part by the solubility of nitrapyrin in the solvents used in the formulation (e.g., Aromatic 100) and its corrosiveness at elevated temperature (i.e., 50° C.). Still other non-polar hydrophobic solvents which can be used in relatively non-corrosive formulations of nitrapyrin include, but are not limited to, other naphthalene depleted solvents, i.e., aromatic solvent that includes less than about 1% naphthalene. Some non-ionic, hydrophobic post-added solvents that can be used to prepare liquid formulations of nitrapyrin include, but are not limited to: cyclohexanone; Aromatic 100

Fluid, also known as solvent naphtha or light aromatic; Aromatic 150 Fluid, also known as solvent naphtha, heavy aromatic, high flash aromatic naphtha type II, heavy aromatic solvent naphtha, hydrocarbons, C10 aromatics, >1% naphthalene, A150, S150; and Aromatic 200 Fluid, also known as solvent naphtha, heavy aromatic, high flash aromatic naphtha type II, heavy aromatic solvent naphtha, hydrocarbons, C10-13 aromatics, >1% naphthalene, A200, and S200.

Nitrapyrin tends to be more soluble in polar solvents than in non-polar solvents. Unfortunately, formulations of nitrapyrin in polar solvents tend to be corrosive, especially towards carbon steel storage containers. Due at least in part to their corrosive properties, formulations of nitrapyrin in polar solvents have proved to be difficult to commercialize. Some aspects of the present invention include identifying and using especially useful corrosion inhibition additives which make practical liquid formulations of nitrapyrin in polar solvent that include on the order of ~360 g/L of nitrapyrin. These inventive formulations are markedly less corrosive than are currently available nitrapyrin polar solvent formulations.

In one embodiment, the (trichloromethyl)pyridine compound is nitrapyrin. The (trichloromethyl)pyridine compound is present in the liquid inhibitor composition at a lower range of 2% by weight of the composition, or in other embodiments, at a lower range of 3% by weight of the composition, or in other embodiments, at a lower range of 5% by weight of the composition.

In another embodiment, the (trichloromethyl)pyridine compound is present in the liquid inhibitor composition at a lower range 0.5%, or 1%, or 2%, or 3%, or 4%, or 5%, 6%, or 8%, or 10% or 12% or 14%, by weight of the composition. In another embodiment, the (trichloromethyl)pyridine compound is present in the liquid inhibitor composition at an upper range of 75%, or 65%, or 60% by weight of the composition. In another embodiment, the (trichloromethyl)pyridine compound is present in the liquid inhibitor composition at an upper range of 60% by weight of the composition. In another embodiment, the (trichloromethyl)pyridine compound is present in the liquid inhibitor composition at an upper range of 55% by weight of the composition. In another embodiment, the (trichloromethyl)pyridine compound is present in the liquid inhibitor composition at an upper range of 59%, or 57%, or 55% or 53% or 50%, by weight of the composition. In another embodiment, the (trichloromethyl)pyridine compound is present in the liquid inhibitor composition at an upper range of 48%, or 46%, or 45% or 42% or 40%, by weight of the composition.

Described herein are high load compositions (in one embodiment, a loading level of 360 g/L) of nitrapyrin, which demonstrate stability in various extreme conditions, such as cold conditions. The compositions as described herein are also capable of provide corrosion resistance to carbon steel tanks.

In one embodiment, the (trichloromethyl)pyridine compound is dispersed in the liquid inhibitor composition at loading level of at least 200 g/L, or in another embodiment, at least 250 g/L, or in another embodiment, at least 300 g/L, or in another embodiment, at least 320 g/L, or in a further embodiment, at least 340 g/L, or in another embodiment, at least 360 g/L, or in yet another embodiment, at least 380 g/L, or in another embodiment, at least 400 g/L.

In one embodiment, the (trichloromethyl)pyridine compound, typically 2-chloro-6-(trichloromethyl)pyridine, has a solubility at 25° C. of at least 300 grams per liter (g/L), or in another embodiment, at least 320 g/L, or in a further embodiment, at least 340 g/L, or in another embodiment, at least 360 g/L, or in yet another embodiment, at least 380 g/L, or in another embodiment, at least 400 g/L.

In one embodiment, the liquid inhibitor composition are made by contacting one or more nitrification inhibitors with a solvent comprising at least one organophosphate compound, whereby the nitrification inhibitor is dissolved or dispersed in the solvent. The liquid inhibitor composition can further comprises at least one additional component, typically a corrosion inhibitor.

The liquid fertilizer compositions, as described herein, comprise: one more nitrogenous fertilizer compounds; at least one nitrification inhibitor comprising a (trichloromethyl)pyridine compound; a solvent comprising an organophosphate compound; and, optionally, a corrosion inhibitor. In one embodiment, the liquid inhibitor composition further comprises at least one additional component including, but not limited to, a co-solvent, a pH adjustor, flow agents, preservatives, buffering agents, antifoam agents, compatibility agents, deposition agents, dispersants, drift control agents, penetrants, surfactants, spreaders, and wetting agents, and the like.

In one embodiment, the nitrogenous fertilizer compound is anhydrous ammonia.

In yet another aspect, described herein are liquid fertilizer compositions comprising, based on weight of the composition: (a) up to about 99 wt %, by weight of composition, of one or more nitrogenous fertilizer compounds, which in one embodiment is anhydrous ammonia (b) a (trichloromethyl)pyridine compound, which in one embodiment is 2-chloro-6-(trichloromethyl)pyridine, (c) a solvent comprising an organophosphate compound, and (d) a corrosion inhibitor. In one embodiment, the organophosphate compound is an alkyl phosphate. In one embodiment, the organophosphate compound is triethyl phosphate. In one embodiment, the organophosphate compound is triethyl phosphate, tri(isobutyl) phosphate, tributoxyethyl phosphate (TBEP) or tris(2-ethylhexyl) phosphate.

Methods of making a liquid fertilizer composition comprising contacting one or more nitrogenous fertilizer compounds with a liquid inhibitor composition, as described herein. In one embodiment, the nitrogenous fertilizer compound is anhydrous ammonia. The liquid inhibitor composition comprises, in one embodiment, at least one of a nitrification inhibitor, which is dissolved or dispersed in a solvent comprising at least one organophosphate compound. In one embodiment, the nitrification inhibitor comprises a (trichloromethyl)pyridine compound. The liquid inhibitor composition, in one embodiment, further comprises at least one additional component, typically a corrosion inhibitor.

In one embodiment, the liquid fertilizer compositions as described herein are utilized for treating soil. The term "treating" in one embodiment means contacting the compositions as described herein with soil. The term "treating", in yet another embodiment, means concurrent mechanical mixing of the described compositions with soil. In another embodiment, the term "treating" means applying the described compositions to the surface of the soil and thereafter mechanically incorporating the compositions into soil (for example, at a certain depth). In yet another embodiment, the term "treating" means incorporating the described compositions into the soil at a certain depth, such as by injection and irrigation.

In one embodiment, the term "treating" means injecting the liquid fertilizer composition as described herein into soil at a depth of less than or equal to 10 inches. In another embodiment, the term "treating" means injecting the liquid fertilizer composition as described herein into soil at a depth of less than or equal to 9 inches, or in some embodiments, less than or equal to 8 inches, or in some embodiments, less than or equal to 7 inches, or in some embodiments, less than or equal to 6 inches, or in some embodiments, less than or equal to 5 inches, or in some embodiments, less than or equal to 4 inches, or in some embodiments, less than or equal to 3 inches.

In another aspect, described herein are methods for fertilizing target plants, comprising applying a liquid fertilizer composition to soil or environment of a target plant, the liquid fertilizer composition comprising: one more nitrogenous fertilizer compounds; at least one nitrification inhibitor comprising a (trichloromethyl)pyridine compound; a solvent comprising an organophosphate compound, and, optionally, a corrosion inhibitor. In one embodiment, the liquid inhibitor composition further comprises at least one additional component including, but not limited to, a co-solvent, a pH adjustor, flow agents, preservatives, buffering agents, antifoam agents, compatibility agents, deposition agents, dispersants, drift control agents, penetrants, surfactants, spreaders, and wetting agents, and the like. In one embodiment, the nitrogenous fertilizer compound is anhydrous ammonia.

In one embodiment, the liquid inhibitor composition or liquid fertilizer composition, as described herein, forms a stable composition at temperatures less than or equal to 15° C., or 10° C., or 7° C., or 5° C., or 3° C. In another embodiment, the liquid inhibitor composition or liquid fertilizer composition, as described herein, forms a stable composition at temperatures less than or equal to 0° C. In another embodiment, the liquid inhibitor composition or liquid fertilizer composition, as described herein, forms a stable composition at temperatures less than or equal to –1° C., or –2° C., or –3° C., or –4° C., or –5° C., or –6° C., or –7° C., or –8° C., or –9° C., or –10° C. In one embodiment, a stable composition means that no flocculation or crystallization is observed over a period of time.

In one embodiment, the liquid inhibitor composition or liquid fertilizer composition, as described herein, forms a stable composition for a period of at least 24 hours. In one embodiment, the liquid inhibitor composition or liquid fertilizer composition, as described herein, forms a stable composition for a period of at least 48 hours. In one embodiment, the liquid inhibitor composition or liquid fertilizer composition, as described herein, forms a stable composition for a period of at least 1 week. In one embodiment, the liquid inhibitor composition or liquid fertilizer composition, as described herein, forms a stable composition for a period of at least 2 weeks.

In one embodiment, the compositions as described herein are stable for at least 3 months in metal containers. In one embodiment, the compositions as described herein are stable for at least 2 months in metal containers at 25° C. (or in some embodiments, 50° C.). In one embodiment, the compositions as described herein are stable for at least 1 month in metal containers at 25° C. (or in some embodiments, 50° C.). The metal containers can be, in one embodiment, carbon steel containers.

In another embodiment, compounds suitable as the organic solvent component of the composition and methods of the present invention form liquid, or otherwise stable, compositions with the nitrification inhibitor at temperatures at or greater than –16° C., in alternative embodiments, greater than –14° C., in other embodiments, greater than –12° C., in other embodiments, greater than –10° C., in further embodiments, greater than –8° C., in other embodiments, greater than –5° C., in other embodiments, greater than –3° C., in other embodiments, greater than –2° C., in other embodiments, greater than 0° C., in other embodiments, greater than 2° C., in other embodiments, greater than 4° C., in other embodiments, greater than 5° C.

In some embodiments, at the specified temperature ranges or at greater than a specified temperature (as described herein), the liquid fertilizer composition is stable, meaning the nitrification inhibitor(s) do not react with the solvent or solvent component under anticipated manufacturing, storage, and use conditions. In another embodiment, at the specified temperature ranges or at greater than a specified temperature (as described herein), the liquid fertilizer composition is stable, meaning the liquid fertilizer composition or liquid inhibitor composition is or substantially is in one phase, i.e., no visible crystals, no visible precipitation, and/or no visible multiple liquid phases.

In one embodiment, the organophosphate compound is according to formula (I)

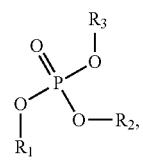

(I)

wherein R1, R2 and R3, are each independently chosen from H, a C1-C16 alkyl group, a C1-C16 alkenyl, group, a C1-C16 alkoxyalkyl group, a C7-C30 alkylarylalkyl group, a C7-C30 arylalkyl group, or an aryl group; provided that at least one of R1, R2 or R3 is not H. In another embodiment, R1, R2 and R3, are each independently chosen from H, a C1-C12 alkyl group, a C1-C12 alkenyl, group, a C1-C12 alkoxyalkyl group, a C7-C30 alkylarylalkyl group, a C7-C30 arylalkyl group, or an aryl group; provided that at least one of R1, R2 or R3 is not H. In one embodiment, R1, R2 and R3, are each independently chosen from H, a C1-C4 alkyl group, a C4-C8 alkyl group, a C1-C12 alkenyl, group, a C1-C4 alkoxyalkyl group, a C7-C30 alkylarylalkyl group, a C7-C30 arylalkyl group, or an aryl group; provided that at least one of R1, R2 or R3 is not H.

In yet another embodiment, R1, R2 and R3, are each independently chosen from a linear or branched C1-C12 alkyl group, a linear or branched C1-C12 alkenyl, group, a linear or branched C1-C12 alkoxyalkyl group, a linear or branched C7-C30 alkylarylalkyl group, a linear or branched C7-C30 arylalkyl group, or an aryl group. In one embodiment, R1, R2 and R3, are each independently chosen from a C1-C12 alkyl group, more typically, a C2-C8 alkyl group.

In one embodiment, R1, R2 and R3, are each independently a C1-C3 alkyl group, typically an ethyl group. In another embodiment, R1, R2 and R3, are each independently a branched C1-C12 alkyl group, typically, a 2-ethylhexyl group. In one embodiment, R1, R2 and R3, are each independently a C1-C12 alkoxyalkyl group, typically a butoxyethyl group.

The present invention described herein will become apparent from the following detailed description and examples, which comprises in one aspect, a liquid inhibitor composition for use in agricultural applications and/or liquid fertilizer compositions comprising: at least one nitrification inhibitor comprising a (trichloromethyl)pyridine compound; a polar solvent blend comprising at least two polar solvents:

(i) a dibasic ester blend and (ii) a ketone such as cyclohexanone; and, optionally, a corrosion inhibitor.

In another aspect, described herein are methods of making liquid inhibitor compositions comprising contacting one or more nitrification inhibitors with a polar solvent blend comprising at least two polar solvents: (i) a dibasic ester blend and (ii) a ketone such as cyclohexanone, whereby the nitrification inhibitor is dissolved or dispersed in the polar solvent blend. In one embodiment, the nitrification inhibitor comprises a (trichloromethyl)pyridine compound. The liquid inhibitor composition, in one embodiment, further comprises at least one additional component, typically a corrosion inhibitor.

In another aspect, described herein are liquid fertilizer compositions for use in agricultural applications comprising: one or more nitrogenous fertilizer compounds; at least one nitrification inhibitor comprising a (trichloromethyl)pyridine compound; a polar solvent blend comprising at least two polar solvents: (i) a dibasic ester blend and (ii) a ketone such as cyclohexanone; and, optionally, a corrosion inhibitor.

In certain embodiments, the dibasic ester blend comprises:

a diester of formula (IIa):

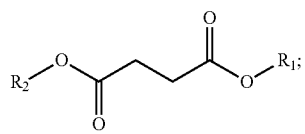
(IIa)

a diester of formula (IIb):

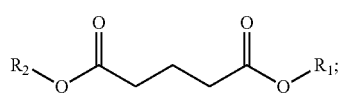
(IIb)

and
a diester of formula (IIc):

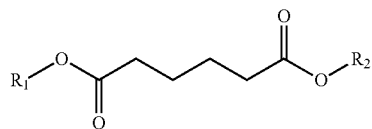
(IIc)

$R_1$ and/or $R_2$ can individually comprise a hydrocarbon having from about 1 to about 8 carbon atoms, typically, methyl, ethyl, propyl, isopropyl, butyl, isobutyl, n-butyl, isoamyl, hexyl, heptyl or octyl.

In certain other embodiments, the dibasic ester blend comprises:
a diester of the formula (IIIa):

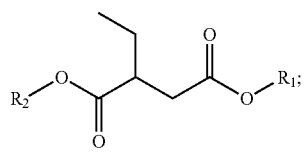
(IIIa)

a diester of the formula (IIIb):

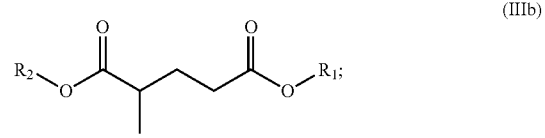
(IIIb)

and, optionally,
a diester of the formula (IIIc):

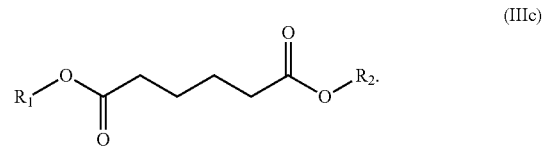
(IIIc)

$R_1$ and/or $R_2$ can individually comprise a hydrocarbon having from about 1 to about 8 carbon atoms, typically, methyl, ethyl, propyl, isopropyl, butyl, isobutyl, n-butyl, isoamyl, hexyl, heptyl, or octyl. In such embodiments, the blend typically comprises (by weight of the blend) (i) from about 5% to about 30% of the diester of formula (IIIc), (ii) from about 70% to about 95% of the diester of formula (IIIb), and (iii) from about 0% to about 10% of the diester of formula (IIIc). More typically, the blend typically comprises (by weight of the blend): (i) from about 6% to about 12% of the diester of formula (IIIa), (ii) from about 86% to about 92% of the diester of formula (IIIb), and (iii) from about 0.5% to about 4% of the diester of formula (IIIc).

Most typically, the blend comprises (by weight of the blend): (i) about 9% of the diester of formula (IIIa), (ii) about 89% of the diester of formula (IIIb), and (iii) about 1% of the diester of formula (Inc). The blend is generally characterized by a flash point of 98° C., a vapor pressure at 20° C. of less than about 10 Pa, and a distillation temperature range of about 200-275° C.

In some embodiments, the polar solvent blend comprises (by weight of the solvent blend) up to 100 wt % or 99.9 wt % of the ketone. In one embodiment, the polar solvent blend comprises (by total weight of the polar solvent blend) up to 80 wt % of the ketone. In one embodiment, the polar solvent blend comprises (by total weight of the polar solvent blend) up to 90 wt % of the ketone. In one embodiment, the polar solvent blend comprises (by total weight of the polar solvent blend) up to 70 wt % of the ketone. In one embodiment, the polar solvent blend comprises (by total weight of the polar solvent blend) up to 65 wt % of the ketone. In one embodiment, the polar solvent blend comprises (by total weight of the polar solvent blend) up to 60 wt % of the ketone. In one embodiment, the polar solvent blend comprises (by total weight of the polar solvent blend) up to 55 wt % of the ketone. In one embodiment, the polar solvent blend comprises (by total weight of the polar solvent blend) up to 50 wt % of the ketone. In one embodiment, the polar solvent blend comprises (by total weight of the polar solvent blend) up to 45 wt % of the ketone. In one embodiment, the polar solvent blend comprises (by total weight of the polar solvent blend) up to 40 wt % of the ketone. It is believe that the composition of the polar solvent blend allows for the loading levels as described herein.

Suitable example of ketones include but are not limited to any one or more of acetone, methyl ethyl ketone, methyl propyl ketone, cyanoacetone, ethoxy: acetone, acetonylacetone, diacetone alcohol, methyl isobutyl ketone, diethyl ketone, diisopropyl ketone, diisobutyl ketone, methyl-n-amyl ketone, methyl-n-hexyl ketone, cyclopentanone, methylcyclohexanone, methyl-cyclopentanone, cyclohexanone, methylallylcyclohexanone, phenylcyclohexanone, cyclohexylcyclohexanone, benzylcyclohexanone, phorone, isophorone, and, B-ionone, methyl vinyl ketone, methyl isopropenyl ketone, methyl propenyl ketone, mesityl oxide, chloroacetone, acetophenone, benzophenone, methyl 2-naphthyl ketone, propiophenone, butyrophenone, p-acetyl biphenyl, p-methylacetophenone, p-methoxyacetophenone, p-chloroacetophenone, p-bromoacetophenone, acetoa'cetic ester, acetoacetic nitrile, acetoacetic amide, acetyl-p cymene, dibenzyl ketone, and the like. In one embodiment, the ketone is cyclohexanone.

In some embodiments, the dibasic ester blend comprises adducts of alcohol and linear diacids, each adduct having the formula (IV):

R—OOC-A-COO—R  (IV)

wherein R is an alkyl group (e.g., methyl, ethyl, etc.) and A is a mixture of —(CH2)4-, —(CH2)3, and —(CH2)2-. In other embodiments, the blend comprises adducts of alcohol, typically ethanol, and linear diacids, the adducts having the formula R1-OOC-A-COO—R2, wherein at least part of R1 and/or R2 are residues of at least one linear alcohol having 4 carbon atoms, and/or at least one linear or branched alcohol having at least 5 carbon atoms, and wherein A is a divalent linear hydrocarbon. In some embodiments A is one or a mixture of —(CH2)4-, —(CH2)3, and —(CH2)2-. In other embodiments, the dibasic ester comprises adducts of an alcohol and linear or branched diacids, the adducts having the formula (IV): R—OOC-A-COO—R, wherein R is an alkyl group (e.g., methyl, ethyl, etc.) and A one of the following: —(CH2)4-, —(CH2)3, —(CH2)2-, —CH2-, or any mixture thereof.

The dibasic ester blend may be derived from one or more by-products in the production of polyamide, for example, polyamide 6,6. In one embodiment, at least one dibasic ester comprises a blend of linear or branched, cyclic or noncyclic, C1-C20 alkyl, aryl, alkylaryl or arylalkyl esters of adipic diacids, glutaric diacids, and succinic diacids. In another embodiment, the composition comprises a blend of linear or branched, cyclic or noncyclic, C1-C20 alkyl, aryl, alkylaryl or arylalkyl esters of adipic diacids, methylglutaric diacids, and ethylsuccinic diacids Generally, polyamide is a copolymer prepared by a condensation reaction formed by reacting a diamine and a dicarboxylic acid. Specifically, polyamide 6,6 is a copolymer prepared by a condensation reaction formed by reacting a diamine, typically hexamethylenediamine, with a dicarboxylic acid, typically adipic acid.

In one embodiment, the blend of dibasic esters can be derived from one or more by-products in the reaction, synthesis and/or production of adipic acid utilized in the production of polyamide, the composition comprising a blend of dialkyl esters of adipic diacids, glutaric diacids, and succinic diacids (herein referred to sometimes as "AGS" or the "AGS blend"), In one embodiment the dibasic ester blend comprises dimethyl adipate, dimethyl glutarate and dimethyl succinate.

In one embodiment, the blend of esters is derived from by-products in the reaction, synthesis and/or production of hexamethylenediamine utilized in the production of polyamide, typically polyamide 6,6. The composition comprises a blend of dialkyl esters of methylglutaric diacids, ethylsuccinic diacids, and optionally adipic diacids (herein referred to sometimes as "MGA", "MGN", "MGN blend" or "MGA blend"). In one embodiment the dibasic ester blend comprises dimethyl adipate, dimethyl methylglutarate and dimethyl ethylsuccinate.

In one embodiment, the liquid inhibitor composition or liquid fertilizer composition further comprises at least one additional component including, but not limited to, a co-solvent, a pH adjustor, flow agents, preservatives, buffering agents, antifoam agents, compatibility agents, deposition agents, dispersants, drift control agents, penetrants, surfactants, spreaders, and wetting agents, and the like. In one embodiment, the nitrogenous fertilizer compound is anhydrous ammonia.

In another aspect, described herein are methods of making a liquid fertilizer compositions comprising contacting one or more nitrogenous fertilizer compounds with liquid inhibitor composition. In one embodiment, the nitrogenous fertilizer compound is anhydrous ammonia. The liquid inhibitor composition comprises, in one embodiment, at least one of a nitrification inhibitor, which is dissolved or dispersed in a solvent blend comprising at least two polar solvents: (i) a dibasic ester blend and (ii) a ketone such as cyclohexanone. In one embodiment, the nitrification inhibitor comprises a (trichloromethyl)pyridine compound. The liquid inhibitor composition, in one embodiment, further comprises at least one additional component, typically a corrosion inhibitor.

In another embodiment, one or more second solvents can be used to dissolve or disperse (trichloromethyl)pyridine compounds at high loading levels and include, but are not limited to, solvent naphtha, aromatic solvents, mineral oils, kerosene, and chlorinated aliphatic and aromatic hydrocarbons. In one particular embodiment, the one or more second solvents used to dissolve or disperse (trichloromethyl)pyridine compounds at high loading levels include but are not limited to xylene and solvent naphtha.

In one particular embodiment, the co-solvent is an ester-amide compound according to formula (II):

R1OOC-A-CONR2R3  (II)

wherein:
A is a divalent linear or branched (C2-C8)aliphatic group, and R1, R2, and R3 are each independently (C1-C12) alkyl, (C1-C12)aryl, (C1-C12)alkaryl or (C1-C12)arylalkyl, and R2 and R3 may each optionally be substituted with one or more hydroxyl groups.

The inventive formulations of (trichloromethyl)pyridine compound may be applied to the soil or a growth medium at a rate in the range of at least one lower limit selected from the group of lower limits consisting of about 0.1, about 0.25, about 0.5 and about 0.58 kg/hectare to at least one upper limit selected from the group consisting of about 1.0, about 1.2 and about 1.5 kg/hectare. The preferred amount can be easily ascertained by the application preference, considering factors such as soil pH, temperature, soil type and mode of application.

The formulations of the present invention can be applied in any manner which will benefit the crop of interest. In one embodiment the inventive formulation is applied to growth medium in a band or row application. In another embodiment, the formulation is applied to or throughout the growth medium prior to seeding or transplanting the desired crop plant. In yet another embodiment, the formulation can be applied to the root zone of growing plants.

The soil may be prepared in any convenient manner compatible with the use of the present invention, including mechanically mixing the formulation with the soil. Still other application may include applying the formulation to the surface of the soil and thereafter dragging, dicing or cutting the formulation into the soil to a desired depth. Still other methods of delivering the nitrification inhibitor into the soil, include methods such as injection, and spraying, or irrigation. In many applications the (trichloromethyl)pyridine compound is delivered into the soil to the desired depth of up to 6 inches (15.24 cm.).

In some embodiments the inventive nitrapyrin formulation may be used along with other agriculturally active ingredients such as insecticides, fungicides, mitocides, herbicides, and the like.

Some exemplary herbicides which can be used along with the inventive nitrapyrin formulations include, but are not limited to acetochlor, alachlor, aminopyralid, atrazine, benoxacor, bromoxynil, carfentrazone, chlorsulfuron, clodinafop, clopyralid, dicamba, diclofop-methyl, dimethenamid, fenoxaprop, flucarbazone, flufenacet, flumetsulam, flumiclorac, fluroxypyr, glufosinate-ammonium, glyphosate, halosulfuron-methyl, imazamethabenz, imazamox, imazapyr, imazaquin, imazethapyr, isoxaflutole, quinclorac, MCPA, MCP amine, MCP ester, mefenoxam, mesotrione, metolachlor, s-metolachlor, metribuzin, metsulfuron methyl, nicosulfuron, paraquat, pendimethalin, picloram, primisulfuron, propoxycarbazone, prosulfuron, pyraflufen ethyl, rimsulfuron, simazine, sulfosulfuron, thifensulfuron, topramezone, tralkoxydim, triallate, triasulfuron, tribenuron, triclopyr, trifluralin, 2,4-D, 2,4-D amine, 2,4-D ester and the like, 4-CPA, 4-CPB, 4-CPP, 2,4-D, 3,4-DA, 2,4-DB, 3,4-DB, 2,4-DEB, 2,4-DEP, 3,4-DP, 2,4,5-TB, 2,3,6-TBA, allidochlor, acetochlor, acifluorfen, aclonifen, alachlor, alloxydim, alorac, ametridione, ametryn, amibuzin, amicarbazone, amidosulfuron, aminocyclopyrachlor, aminopyralid, aminopyralid, amiprofos-methyl, amitrole, anilofos, anisuron, asulam, asulam, atraton, atrazine, azafenidin, azimsulfuron, aziprotryne, barban, BCPC, beflubutamid, benazolin, bencarbazone, benfluralin, benfuresate, bensulfuron, bensulide, bentazone, benzadox, benzfendizone, benzipram, benzobicyclon, benzofenap, benzofluor, benzoylprop, benzthiazuron, bicyclopyrone, bifenox, bilanafos, bilanafos, bispyribac, bromacil, bromobonil, bromobutide, bromofenoxim, bromoxynil, brompyrazon, butachlor, butafenacil, butamifos, butenachlor, buthidazole, buthiuron, butralin, butroxydim, buturon, butylate, cafenstrole, cafenstrole, cambendichlor, carbasulam, carbasulam, carbetamide, carboxazole chlorprocarb, carfentrazone, CDEA, CEPC, chlomethoxyfen, chloramben, chloranocryl, chlorazifop, chlorazine, chlorbromuron, chlorbufam, chloreturon, chlorfenac, chlorfenprop, chlorflurazole, chlorflurenol, chloridazon, chlorimuron, chlornitrofen, chloropon, chlorotoluron, chloroxuron, chloroxynil, chlorpropham, chlorsulfuron, chlorthal, chlorthiamid, cinidon-ethyl, cinmethylin, cinosulfuron, cisanilide, clethodim, cliodinate, clodinafop, clofop, clomazone, clomeprop, clomeprop, cloprop, cloproxydim, clopyralid, clopyralid, cloransulam, CPMF, CPPC, credazine, cumyluron, cyanatryn, cyanazine, cycloate, cyclosulfamuron, cycloxydim, cycluron, cyhalofop, cyperquat, cyprazine, cyprazole, cypromid, daimuron, dalapon, dazomet, delachlor, desmedipham, desmetryn, diallate, dicamba, dichlobenil, dichloralurea, dichlormate, dichlorprop, dichlorprop-P, diclofop, diclosulam, diethamquat, diethatyl, difenopenten, difenoxuron, difenzoquat, diflufenican, diflufenzopyr, dimefuron, dimepiperate, dimethachlor, dimethametryn, dimethenamid, dimethenamid-P, dimexano, dimidazon, dinitramine, dinitramine, dinofenate, dinoprop, dinosam, dinoseb, dinoterb, diphenamid, dipropetryn, diquat, disul, dithiopyr, diuron, DMPA, DNOC, EBEP, eglinazine, endothal, epronaz, epronaz, EPTC, erbon, esprocarb, ethalfluralin, ethametsulfuron, ethidimuron, ethiolate, ethofumesate, ethoxyfen, ethoxysulfuron, etinofen, etnipromid, etnipromid, etnipromid, etobenzanid, EXD, fenasulam, fenasulam, fenasulam, fenoprop, fenoxaprop, fenoxaprop-P, fenoxasulfone, fenteracol, fenthiaprop, fentrazamide, fenuron, flamprop, flamprop-M, flazasulfuron, florasulam, fluazifop, fluazifop-P, fluazolate, flucarbazone, flucetosulfuron, fluchloralin, flufenacet, flufenican, flufenpyr, flumetsulam, flumezin, flumiclorac, flumioxazin, flumipropyn, fluometuron, fluorodifen, fluoroglycofen, fluoromidine, fluoronitrofen, fluothiuron, flupoxam, flupoxam, flupropacil, flupropanate, flupyrsulfuron, fluridone, flurochloridone, fluroxypyr, flurtamone, fluthiacet, fomesafen, fomesafen, foramsulfuron, fosamine, furyloxyfen, glufosinate, glyphosate, halauxifen, halosafen, halosafen, halosulfuron, haloxydine, haloxyfop, haloxyfop-P, hexazinone, imazamethabenz, imazamox, imazapic, imazapyr, imazaquin, imazethapyr, imazosulfuron, indanofan, indaziflam, iodobonil, iodosulfuron, ioxynil, ipazine, ipfencarbazone, iprymidam, isocarbamid, isocil, isomethiozin, isonoruron, isopolinate, isopropalin, isoproturon, isouron, isoxaben, isoxachlortole, isoxaflutole, isoxapyrifop, karbutilate, ketospiradox, lactofen, lenacil, linuron, MCPA, MCPA-thioethyl, MCPB, mecoprop, mecoprop-P, medinoterb, mefenacet, mefluidide, mesoprazine, mesosulfuron, mesotrione, metam, metamifop, metamifop, metamitron, metazachlor, metazosulfuron, metflurazon, methabenzthiazuron, methalpropalin, methazole, methiobencarb, methiozolin, methiuron, methiuron, methometon, methoprotryne, methyldymron, metobenzuron, metobromuron, metolachlor, S-metolachlor, metosulam, metoxuron, metribuzin, metsulfuron, molinate, monalide, monisouron, monochloroacetic acid, monolinuron, monuron, morfamquat, naproanilide, napropamide, naptalam, neburon, nicosulfuron, nipyraclofen, nitralin, nitrofen, nitrofluorfen, norflurazon, noruron, OCH, orbencarb, orthosulfamuron, oryzalin, oryzalin, oxadiargyl, oxadiazon, oxapyrazon, oxasulfuron, oxaziclomefone, oxyfluorfen, parafluron, paraquat, pebulate, pelargonic acid, pendimethalin, penoxsulam, pentanochlor, pentoxazone, perfluidone, pethoxamid, phenisopham, phenmedipham, phenmedipham-ethyl, phenobenzuron, picloram, picloram, picolinafen, picolinafen, pinoxaden, piperophos, pretilachlor, primisulfuron, procyazine, prodiamine, prodiamine, profluazol, profluralin, profoxydim, proglinazine, prometon, prometryn, propachlor, propanil, propaquizafop, propazine, propham, propisochlor, propoxycarbazone, propyrisulfuron, propyzamide, prosulfalin, prosulfocarb, prosulfuron, proxan, prynachlor, pydanon, pyraclonil, pyraflufen, pyrasulfotole, pyrazolynate, pyrazosulfuron, pyrazoxyfen, pyribenzoxim, pyributicarb, pyriclor, pyridafol, pyridate, pyriftalid, pyriminobac, pyrimisulfan, pyrithiobac, pyroxasulfone, pyroxsulam, quinclorac, quinmerac, quinoclamine, quinonamid, quizalofop, quizalofop-P, rhodethanil, rimsulfuron, sebuthylazine, secbumeton, sethoxydim, siduron, simazine, simeton, simetryn, sulcotrione, sulfallate, sulfentrazone, sulfometuron, sulfosulfuron, sulglycapin, swep, tebutam, tebuthiuron, tefuryltrione, tembotrione, tepraloxydim, terbacil, terbucarb, terbuchlor, terbumeton, terbuthylazine, terbutryn, tetrafluron, thenylchlor, thiazafluron, thiazopyr and triclopyr, thidiazimin, thidiazuron, thidiazuron, thiencarbazone-methyl, thifensulfuron, thiobencarb, tiocarbazil, tioclorim, topramezone, tralkoxydim, tri-allate, triasulfuron, triaziflam, tribenuron, tricamba, tridiphane, trietazine, trifloxysulfuron, trifluralin, triflusulfuron, trifop, trifopsime, trihydroxytriazine, trimeturon, tripropindan, tritac, tritosulfuron, vernolate, xylachlor, and compounds of the following Formula

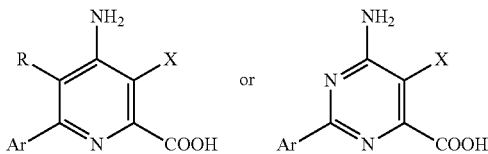

wherein Ar represents a phenyl group substituted with one to four substituents independently selected from halogen, C1-C6 alkyl, C1-C6 alkoxy, C2-C4 alkoxyalkyl, C2-C6 alkylcarbonyl, C1-C6 alkylthio, C1-C6 haloalkyl, C1-C6 haloalkoxy, C2-C4 haloalkoxyalkyl, C2-C6 haloalkylcarbonyl, C1-C6 haloalkylthio, —OCH2CH2-, —OCH2CH2CH2-, —OCH2O— or —OCH2CH2O—; R represents H or F; X represents Cl or vinyl; and Y represents Cl, vinyl or methoxy; and their salts and esters as disclosed, for example, in U.S. Pat. No. 7,314,849 B2, U.S. Pat. No. 7,300,907 B2, U.S. Pat. No. 7,786,044 B2 and U.S. Pat. No. 7,642,220 B2. Depending upon the stability of the herbicide compounds used in the presence of the component of the inventive formulation and the preferred mode of applying the compounds these compounds may be applied along with the inventive nitrapyrin formulation. In many instances the compound may be applied by any suitable means either before or after the inventive formulation is applied to the soil.

Especially suitable herbicides useful with the compositions and methods described herein include 2,4-D, 2,4-DB, aminocyclopyrachlor, aminopyralid, clopyralid, dicamba, fluroxypyr, halauxifen, MCPA, MCPB, picloram, triclopyr, acetochlor, atrazine, benfluralin, cloransulam, cyhalofop, diclosulam, dithiopyr, ethalfluralin, florasulam, flumetsulam, glufosinate, glyphosate, haloxyfop, isoxaben, MSMA, oryzalin, oxyfluorfen, pendimethalin, penoxsulam, propanil, pyroxsulam, quizalofop, tebuthiuron, trifluralin, and the compound of the Formula.

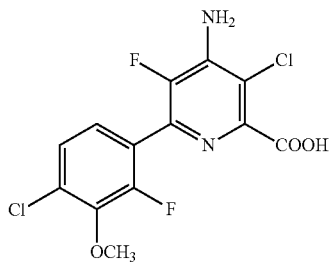 [SMILES: COc1c(Cl)ccc(-c2nc(C(=O)O)c(Cl)c(N)c2F)c1F]

and its C1-C12 alkyl or C7-C12 arylalkyl ester or salt derivatives such as, for example, the benzyl ester.

Some exemplary insecticides which can be used along with the inventive nitrapyrin formulations include, but are not limited to abamectin, acephate, acetamiprid, acrinathrin, alpha-cypermethrin, alpha-endosulfan, azadirachtin, azinphos-ethyl, azinphos-methyl, bendiocarb, benfuracarb, bensultap, beta-cyfluthrin, beta-cypermethrin, bifenthrin, bufencarb, buprofezin, butacarb, cadusafos, carbaryl, carbofuran, carbosulfan, cartap, cartap hydrochloride, chlorantraniliprole, chlorfenapyr, chlorfenvinphos, chlorfluazuron, chlormephos, chlorpyrifos, chlorpyrifos-methyl, chromafenozide, clothianidin, cyantraniliprole, cyfluthrin, cyhalothrin, cypermethrin, deltamethrin, diazinon, dicrotophos, diflubenzuron, dimethoate dinotefuran, disulfoton, emamectin, emamectin benzoate, endosulfan, endothion, endrin, EPN, esfenvalerate, etaphos, ethiofencarb, ethion, ethiprole, ethoate-methyl, etofenprox, fenamiphos, fenazaflor, fenethacarb, fenitrothion, fenobucarb, fenpropathrin, fensulfothion, fenthion, fenthion-ethyl, fenvalerate, fipronil, flonicamid, flubendiamide, flucythrinate, fonofos, fufenozide, furathiocarb, gamma-cyhalothrin, gamma-HCH, halfenprox, halofenozide, heptenophos, hyquincarb, imidacloprid, indoxacarb, isazofos, isobenzan, isocarbophos, isofenphos, isofenphos-methyl, isoprocarb, isothioate, isoxathion, kinoprene, lambda-cyhalothrin, lepimectin, lufenuron, malathion, methamidophos, methomyl, methoxyfenozide, mevinphos, mexacarbate, milbemectin, monocrotophos, nitenpyram, novaluron, omethoate, oxamyl, oxydemetonmethyl, oxydeprofos, oxydisulfoton, parathion, parathion-methyl, penfluron, permethrin, phenthoate, phorate, phosalone, phosfolan, phosmet, phosphamidon, pirimetaphos, pirimicarb, pirimiphos-ethyl, pirimiphos-methyl, primidophos, profenofos, profluthrin, promecarb, propaphos, propoxur, prothiofos, pymetrozine, pyrafluprole, pyridalyl, pyrifluquinazon, pyriprole, pyriproxyfen, spinetoram, spinosad, spirotetramat, sulfoxaflor, sulprofos, tau-fluvalinate, tebufenozide, tebufenpyrad, teflubenzuron, tefluthrin, tetramethylfluthrin, theta-cypermethrin, thiacloprid, thiamethoxam, thicrofos, thiocyclam, thiocyclam oxalate, thiodicarb, thiometon, thiosultap, thiosultap-disodium, thiosultap-monosodium, thuringiensin, tolfenpyrad, triazophos, triflumuron and zeta-cypermethrin. Depending upon the stability of the insecticide compounds used in the presence of the component of the inventive formulation and the preferred mode of applying the compounds these compounds may be applied along with the inventive nitrapyrin formulation. In many instances the compound may be applied by any suitable means either before or after the inventive formulation is applied to the soil.

Some exemplary fungicides which can be used along with the inventive nitrapyrin formulations include, but are not limited to tricyclazole, phthalide, carpropamide, pyroquilon, diclocymet, fenoxanil, probenazole, isoprothiolane, iprobenfos, isotianil, tiadinil, kasugamycin, flutolanil, mepronil, pencycuron, polyoxins, validamycin, toclophos-methyl, boscalid, penthiopyrad, thifluzamide, bixafen, fluopyram, isopyrazam, propiconazole, difenoconazole, fenbuconazole, ipconazole, triadimefon, hexaconazole, azoxystrobin, metaminostrobin, orysastrobin and acibenzolar-S-methyl. Some of these fungicides may not be effective for disease control when applied at the timing of application of the inventive formulation because fungal disease propagation and growth cycles may not be optimal. The effective use and application timing of these fungicides can be easily determined by one of normal skill in the art. Depending upon the stability of the fungicide compounds used in the presence of the component of the inventive formulation and the preferred mode of applying the compounds these compounds may be applied along with the inventive nitrapyrin formulation. In many instances the compound may be applied by any suitable means either before or after the inventive formulation is applied to the soil.

Some exemplary herbicide safeners which can be used along with the inventive nitrapyrin formulations include, but are not limited to benoxacor, benthiocarb, cloquintocet-mexyl, daimuron, dichlormid, dicyclonon, dimepiperate, fenchlorazole-ethyl, fenclorim, flurazole, fluxofenim, furilazole, Harpin proteins, isoxadifen-ethyl, mefenpyr-diethyl, mephenate, MG 191, MON 4660, naphthalic anhydride (NA), oxabetrinil, 829148 and N-phenyl-sulfonylbenzoic acid amides. Depending upon the stability of the herbicide safener compounds used in the presence of the component of the inventive formulation and the preferred mode of applying the compounds these compounds may be applied along with the inventive nitrapyrin formulation. In many instances the compound may be applied by any suitable means either before or after the inventive formulation is applied to the soil.

Some exemplary plant growth regulators which can be used along with the inventive nitrapyrin formulations include, but are not limited to 2,4-D, 2,4-DB, IAA, IBA, naphthaleneacetamide, α-naphthaleneacetic acid, kinetin, zeatin, ethephon, aviglycine, 1-methylcyclopropene (1-MCP), ethephon, gibberellins, gibberellic acid, abscisic acid, ancymidol, flurprimidol, mefluidide, paclobutrazol, tetcyclacis, uniconazole, brassinolide, brassinolide-ethyl and ethylene. Depending upon the stability of the plant growth regulator compounds used in the presence of the component of the inventive formulation and the preferred mode of applying the compounds these compounds may be applied along with the inventive nitrapyrin formulation. In many instances the compound may be applied by any suitable means either before or after the inventive formulation is applied to the soil.

Exemplary Formulations

The high load nitrapyrin SL formulations (360 g/L) comprising polar solvents were prepared by dissolving nitrapyrin technical in the solvent systems, which included polar solvent miscible corrosion inhibitors. The solutions were mixed under IKA mixing until they were essentially homogeneous.

Referring now to Table 1. All samples were tested for metal corrosion stability at different time intervals at 50° C. temperature and compared against N-Serve commercial control formulation. Results are shown in the Table 1. Metal coupons (Carbon steel; AISI 1018) were tested for corrosion stability in 40 ml prepared nitrapyrin formulations. Coupons were ~45% submerged in the solution for the corrosion testing. Metal coupons were approximately one half inch in width and three inches in length with a thickness of 1/16th to 1/8th of an inch. During the testing, coupons were visually inspected for corrosion by checking any color changes or residue deposits on the coupon surface. The results of these experiments are summarized in Table 1.

TABLE 1

Example composition of stable high load nitrapyrin SL formulations (360 g/L nitrapyrin technical) comprising polar solvents after corrosion testing with carbon steel coupons at 50° C. Control (N-Serve) sample has a nitrapyrin loading of 240 g/L.

| Sample # | Nitrapyrin technical Loading (Wt %) | Solvents | Corrosion Inhibitor Additives | # of days without visible corrosion |
|---|---|---|---|---|
| 1 (Control) | 24.74 | Aromatic 100 (66.53 wt %) Xylene (7.398 wt %) | ELO (0.75 wt %) | 53 |
| 2 | 34.6 | Hallcomid M-8-10 (63.4 wt %) | ELO (1 wt %) 2,6 Lutidine (1 wt %) | 67 |
| 3 | 34.6 | Hallcomid M-8-10 (63.4 wt %) | ELO (1 wt %) Nicotinamide (1 wt %) | 7 |
| 4 | 32.9 | Cyclohexanone (6439 wt %) | DER331 (1.2 wt %) 2,6 Lutidine (1 wt %) | 53 |
| 5 | 34.6 | Hallcomid M-8-10 (63.2 wt %) | DER331 (1.2 wt %) 2,6 Lutidine (1 wt %) | 43 |
| 6 | 32.94 | Cyclohexanone (51.89 wt %) Aromatic 100 (12.97 wt %) | DER331 (1.2 wt %) 2,6 Lutidine (1 wt %) | 46 |
| 7 | 34.62 | Hallcomid M-8-10 (50.71 wt %) Aromatic 100 (12.68 wt %) | ELO (1 wt %) 2,6 Lutidine (1 wt %) | 67 |
| 8 | 34.62 | Hallcomid M-8-10 (50.55 wt %) Aromatic 100 (12.64 wt %) | DER331 (1.2 wt %) 2,6 Lutidine (1 wt %) | >120 |
| 9 | 32.94 | Cyclohexanone (51.41 wt %) Aromatic 100 (12.85 wt %) | DER331 (1.8 wt %) α-picoline (1 wt %) | 32 |
| 10 | 34.62 | Hallcomid M-8-10 (50.71 wt %) Aromatic 100 (12.68 wt %) | ELO (1.5 wt %) Nicotinamide (0.5 wt %) | 22 |
| 11 | 34.62 | Hallcomid M-8-10 (50.71 wt %) Aromatic 100 (12.68 wt %) | ELO (1.5 wt %) Nicotinamide (2.5 wt %) | 51 |
| 12 | 34.62 | Hallcomid M-8-10 (50.55 wt %) Aromatic 100 (12.64 wt %) | DER331 (1.2 wt %) α-picoline (1 wt %) | 35 |
| 13 | 34.29 | Hallcomid M-8-10 (46.44 wt %) Aromatic 100 (15.48 wt %) | DER331 (1.8 wt %) Nicotinamide (2 wt %) | 18 |
| 14 | 34.29 | Hallcomid M-8-10 (61.89 wt %) | ELO (1.5 wt %) Nicotinamide (2 wt %) | 30 |
| 15 | 34.62 | RhodiaSolv RPDE (50.47 wt %) Cyclohexanone (12.62 wt %) | ELO (1.5 wt %) Nicotinamide (.8 wt %) | >120 |
| 16 | 34.62 | RhodiaSolv RPDE (63.08 wt %) | ELO (1.5 wt %) Nicotinamide (0.8 wt %) | 105 |
| 17 | 34.62 | RhodiaSolv RPDE (63.88 wt %) | ELO (1.5 wt %) | 19 |
| 18 | 30.90 | RhodiaSolv PolarClean (67.10 wt %) | ELO (1 wt %) Nicotinamide (1 wt %) | 4 |
| 19 | 30.90 | RhodiaSolv PolarClean (67.10 wt %) | ELO (1 wt %) 2,6 Lutidine (1 wt %) | 4 |

TABLE 1-continued

Example composition of stable high load nitrapyrin SL formulations (360 g/L nitrapyrin technical) comprising polar solvents after corrosion testing with carbon steel coupons at 50° C. Control (N-Serve) sample has a nitrapyrin loading of 240 g/L.

| Sample # | Nitrapyrin technical Loading (Wt %) | Solvents | Corrosion Inhibitor Additives | # of days without visible corrosion |
|---|---|---|---|---|
| 20 | 30.90 | RhodiaSolv RPDE (66.90 wt %) | DER331 (1.2 wt %) 2,6 Lutidine (1 wt %) | 4 |
| 21 | 30.90 | RhodiaSolv RPDE (66.90 wt %) | DER331 (1.2 wt %) Nicotinamide (1 wt %) | 4 |
| 22 | 32.94 | Dowanol DPM (62.76 wt %) | DER331 (1.8 wt %) Nicotinamide (2.5 wt %) | 3 |
| 23 | 33.65 | Dowanol DPM (62.35 wt %) | ELO (1.5 wt %) Nicotinamide (2.5 wt %) | 3 |
| 24 | 34.6 | TamiSolve NxG (61.40 wt %) | ELO (1.5 wt %) Nicotinamide (2.5 wt %) | 4 |

Common chemical names of commercially available solvents found in Table 1: Hallcomid M-8-10: Mixture of N,N-dimethyloctanamide (N,N-dimethylcaprylamide) and N,N-dimethyldecanamide (N,N-dimethylcapramide); RhodiaSolv RPDE: Solvent mixture composed of a reaction mass of dimethyl adipate, dimethyl glutarate and dimethyl succinate; and Aromatic 100: Solvent Naphtha (petroleum), light aromatic; TamiSolve NxG: N-butylpyrrolidone.

Example 2

A stock solution of 360 g/L nitrapyrin technical grade in triethyl phosphate was prepared and additives in specific amounts to limit corrosion to carbon steel were added to this solution. A small quantity (~15 mL) of the solution in glass jars were left for storage stability at room temperature (~20 C) and −12 C. The −12 C sample was seeded after it reached 24 hrs age by incorporating few small grains of nitrapyrin technical in the cold solution and was immediately stored back to the −12 C storage temperature. A carbon steel coupon was partially submerged into the solution stored at 54 C. The coupon was periodically observed for any sign of corrosion in liquid and vapor phases. The solutions at room temperature and −12 C were observed for any inhomogeneity, crystallization and flowability. Table 2 shows summary of the observations.

TABLE 2

| Composition | Day Tested | Coupon Corrosion (54 C.) | −12 C. stability |
|---|---|---|---|
| Stock solution (no additive) | 28 days | Corroded overnight | Small amount of crystals formed overnight |
| Stock (99%) + AMP-95 (1%) | 28 days | No corrosion | Homogeneous solution |
| Stock (99%) + Quinaldine (1%) | 28 days | No corrosion | Small amount of crystals |
| Stock (98.5%) + | 18 days | No corrosion | Small amount |

TABLE 2-continued

| Composition | Day Tested | Coupon Corrosion (54 C.) | −12 C. stability |
|---|---|---|---|
| Epoxidized linseed oil (1%) + AMP 95 (0.5%)* | | | of crystals |
| Stock (98.5%) + Epoxydecane (1%) + AMP 99 (0.5%) | 18 days | No corrosion | Small amount of crystals |
| Stock (98.5%) + Epoxidized linseed oil (1%) + Methyl Nicotinate (0.5%) | 18 days | No corrosion | Small amount of crystals |
| Stock (98.5%) + Epoxydecane (1%) + Methyl Nicotinate (0.5%) | 18 days | No corrosion | Homogeneous solution |

Example 3

Homogeneous compositions of nitrapyrin technical grade (90%, 360 g/L) were made in different ratios of mixture of cyclopentanone or cyclohexanone and Rhodiasolv RPDE (mixture of dimethyl glutarate, dimethyl adipate and dimethyl succinate). A small quantity (~15 mL) of the solution in glass jars were left for storage stability evaluation at room temperature (~20 C) and −10 C. The −10 C sample was seeded after it reached 24 hrs age by incorporating few small grains of nitrapyrin technical in the cold solution and was immediately stored back to the −10 C temperature. The solutions at different temperatures were observed for any inhomogeneity, crystallization and flowability. No crystals or any other inhomogeneities were observed in the solution at any temperatures within 2 weeks of storage. Table 3 shows a summary of the compositions and their stability.

TABLE 3

| Composition (360 g/L Nitrapyrin technical in solvent mixtures) | Stability at room temperature and −10 C. |
|---|---|
| Cylcopentanone/RPDE (60-40 wt %) | Homogeneous solution |
| Cylcohexanone/RPDE (60-40 wt %) | Homogeneous solution |
| Cyclopentanone | Homogeneous solution |
| Cyclohexanone | Homogeneous solution |

Corrosion Tests:

A stock solution of 360 g/L nitrapyrin technical grade in cyclohexanone/RPDE (60:40 weight ratio) was prepared and corrosion inhibitors in specific amounts were added to this solution. The resultant solutions were tested for corrosion issues with carbon steel tanks using following protocol. A carbon steel coupon was partially submerged into the solution stored at 54 C. The coupon was periodically observed for any sign of corrosion in liquid and vapor phases. Table 4 shows a summary of the observations.

TABLE 4

| Composition | Coupon appearance |
|---|---|
| Stock (no corrosion inhibitor) | Corrosion in liquid and vapor phase overnight |
| 98.5 wt % Stock + 1.0 wt % Epoxydecane + 0.5% Nicotinamide | No sign of corrosion in liquid or vapor phase for duration of observation (45 days) |

TABLE 4-continued

| Composition | Coupon appearance |
|---|---|
| 98.5 wt % Stock + 1.0 wt % Epoxydecane + 0.5% 1-methyl Imidazole | No sign of corrosion in liquid or vapor phase for duration of observation (18 days) |
| 97.0 wt % Stock + 1.0 wt % Nicotinamide + 2.0 wt % epoxidized linseed oil | No sign of corrosion in liquid phase and slight corrosion in vapor phase for duration of observation (90 days); test conducted at 50 C. |

Example 4

Storage stability tests: Homogeneous composition of nitrapyrin technical grade (360 g/L) was dispersed in methoxybenzene solvent, and a quantity of about 15 mL of the solution in glass jars were left for storage stability at room temperature (~20° C.), 54° C. and −7° C. The −7° C. sample was seeded after it reached 24 hrs age by incorporating few small grains of nitrapyrin technical in the cold solution and was immediately stored back to the −7° C. temperature. The solutions at different temperatures were observed for any inhomogeneity, crystallization and flowability. No crystals or any other inhomogeneities were observed in the solution at any temperatures within 2 weeks of storage.

Corrosion Tests:

A stock solution of 360 g/L nitrapyrin technical grade in methoxybenzene was prepared and corrosion inhibitors in specific amount were added to this solution. The resultant solutions were tested for corrosion issues with carbon steel tanks using following protocol. A carbon steel coupon was partially submerged into the solution stored at 54° C. The coupon was periodically observed for any sign of corrosion in liquid and vapor phases. Table 5 shows summary of the observations.

TABLE 5

| Composition | Coupon appearance |
|---|---|
| Stock (no corrosion inhibitor) | No sign of corrosion in liquid or vapor phase until 45 days; later corrosion in vapor phase |
| 98.5 wt % Stock + 1.0 wt % Methyl Isonicotinate + 0.5% AMP-95 | No sign of corrosion in liquid or vapor phase for duration of observation (70 days) |
| 99.0 wt % Stock + 0.5 wt % Nictotinamide + 0.5% AMP-95 | No sign of corrosion in liquid or vapor phase for duration of observation (70 days) |
| 99.0 wt % Stock + 0.5 wt % Nictotinamide + 1% Epoxydecane | No sign of corrosion in liquid or vapor phase for duration of observation (24 days) |

While the novel technology has been illustrated and described in detail in the figures and foregoing description, the same is to be considered as illustrative and not restrictive in character, it being understood that only the preferred embodiments have been shown and described and that all changes and modifications that come within the spirit of the novel technology are desired to be protected. As well, while the novel technology was illustrated using specific examples, theoretical arguments, accounts, and illustrations, these illustrations and the accompanying discussion should by no means be interpreted as limiting the technology. All patents, patent applications, and references to texts, scientific treatises, publications, and the like referenced in this application are incorporated herein by reference in their entirety.

We claim:

1. A formulation, comprising:
an inhibitor of nitrification;
at least one corrosion inhibitor;
a polar first solvent capable of dissolving the nitrification inhibitor; and
a second solvent, the second solvent is miscible in the polar first solvent and wherein the second solvent is no more polar than the first solvent;
wherein the polar first solvent is an alkoxybenzene compound selected from methoxybenzene and ethoxybenzene.

2. A formulation comprising:
an inhibitor of nitrification;
at least one corrosion inhibitor;
a polar first solvent capable of dissolving the nitrification inhibitor; and
a second solvent, the second solvent is miscible in the polar solvent and wherein the second solvent is no more polar than the first solvent; wherein said formulation comprises:
about 250 to about 300 g/L of 2-chloro-6-(trichloromethyl)pyridine;
about 40 to about 60 weight percent of a mixture of N,N-dimethyloctanamide (N,N-dimethylcaprylamide) and N,N-dimethyldecanamide (N,N-dimethylcapramide);
about 0.5 to about 1.5 weight percent of liquid epoxy resin and about 0.5 to about 1.5 weight percent 2,6-dimethylpyridine; and
about 5 to about 20 weight percent solvent naphtha.

3. A formulation comprising:
an inhibitor of nitrification;
at least one corrosion inhibitor;
a polar first solvent capable of dissolving the nitrification inhibitor; and
a second solvent, the second solvent is miscible in the polar solvent and wherein the second solvent is no more polar than the first solvent; wherein said formulation comprises:
about 230 to about 300 g/L of 2-chloro-6-(trichloromethyl)pyridine;
about 45 to about 55 weight percent of a mixture of N,N-dimethyloctanamide (N,N-dimethylcaprylamide) and N,N-dimethyldecanamide (N,N-dimethylcapramide);
about 0.75 to about 1.4 weight percent of liquid epoxy resin;
about 0.5 to about 1.5 weight percent 2,6-dimethylpyridine; and
about 10 to about 15 weight percent solvent naphtha.

4. A formulation comprising:
an inhibitor of nitrification;
at least one corrosion inhibitor;
a polar first solvent capable of dissolving the nitrification inhibitor; and
a second solvent, the second solvent is miscible in the polar solvent and wherein the second solvent is no more polar than the first solvent; wherein said formulation comprises:
about 240 g/L of 2-chloro-6-(trichloromethyl)pyridine;
about 50.0 to about 55 weight percent of a mixture of N,N-dimethyloctanamide (N,N-dimethylcaprylamide) and N,N-dimethyldecanamide (N,N-dimethylcapramide);
about 1.0 to about 1.1 weight percent of liquid epoxy resin oil;

about 0.5 to about 1.5 weight percent 2,6-dimethylpyridine; and
about 11.0 to about 14.0 weight percent solvent naphtha.

5. A formulation comprising:
an inhibitor of nitrification;
at least one corrosion inhibitor;
a polar first solvent capable of dissolving the nitrification inhibitor; and
a second solvent, the second solvent is miscible in the polar solvent and wherein the second solvent is no more polar than the first solvent; wherein said formulation comprises:
about 240 g/L of 2-chloro-6-(trichloromethyl)pyridine;
about 50.55 weight percent of a mixture of N,N-dimethyloctanamide (N,N-dimethylcaprylamide) and N,N-dimethyldecanamide (N,N-dimethylcapramide);
about 1.2 weight percent of liquid epoxy resin oil;
about 0.5 to about 1.5 weight percent 2,6-dimethylpyridine; and
about 12.64 weight percent solvent naphtha.

6. A formulation comprising:
an inhibitor of nitrification;
at least one corrosion inhibitor;
a polar first solvent capable of dissolving the nitrification inhibitor; and
a second solvent, the second solvent is miscible in the polar solvent and wherein the second solvent is no more polar than the first solvent; wherein said formulation comprises:
about 200 to about 400 g/L of 2-chloro-6-(trichloromethyl)pyridine;
about 20 to about 50 weight percent of a dibasic ester;
about 0.5 to about 2.5 weight percent of epoxidized linseed oil;
about 0.5 to about 2.5 weight percent of nicotinamide; and
about 20.0 to about 50.0 weight percent of cyclohexanone.

7. A formulation comprising:
an inhibitor of nitrification;
at least one corrosion inhibitor;
a polar first solvent capable of dissolving the nitrification inhibitor; and
a second solvent, the second solvent is miscible in the polar solvent and wherein the second solvent is no more polar than the first solvent; wherein said formulation comprises:
about 240 g/L to about 350 g/L of 2-chloro-6-(trichloromethyl)pyridine;
about 20 to about 40 weight percent of a dibasic ester;
about 1.5 to about 2.5 weight percent of epoxidized linseed oil;
about 0.5 to about 1.5 weight percent nicotinamide; and
about 25.0 to about 45.0 weight percent cyclohexanone.

8. A formulation comprising:
an inhibitor of nitrification;
at least one corrosion inhibitor;
a polar first solvent capable of dissolving the nitrification inhibitor; and
a second solvent, the second solvent is miscible in the polar solvent and wherein the second solvent is no more polar than the first solvent; wherein said formulation comprises:
about 240 g/L of 2-chloro-6-(trichloromethyl)pyridine;
about 50.47 weight percent of a dibasic ester;
about 1.5 weight percent of epoxidized linseed oil;
about 0.8 weight percent nicotinamide; and
about 12.62 weight percent cyclohexanone.

9. A formulation comprising:
an inhibitor of nitrification;
at least one corrosion inhibitor;
a polar first solvent capable of dissolving the nitrification inhibitor; and
a second solvent, the second solvent is miscible in the polar solvent and wherein the second solvent is no more polar than the first solvent; wherein said formulation comprises:
about 200 to about 400 g/L of 2-chloro-6-(trichloromethyl)pyridine;
about 40 to about 60 weight percent of a dibasic ester;
about 0.5 to about 2.5 weight percent of epoxidized linseed oil; and
about 0.4 to about 1.5 weight percent nicotinamide.

10. A formulation comprising:
an inhibitor of nitrification;
at least one corrosion inhibitor;
a polar first solvent capable of dissolving the nitrification inhibitor; and
a second solvent, the second solvent is miscible in the polar solvent and wherein the second solvent is no more polar than the first solvent; wherein said formulation comprises:
about 240 g/L of 2-chloro-6-(trichloromethyl)pyridine;
about 63.08 weight percent of a dibasic ester;
about 1.5 weight percent of epoxidized linseed oil; and
about 0.6 to about 1.0 weight percent nicotinamide.

11. A formulation comprising:
an inhibitor of nitrification;
at least one corrosion inhibitor;
a polar first solvent capable of dissolving the nitrification inhibitor; and
a second solvent, the second solvent is miscible in the polar solvent and wherein the second solvent is no more polar than the first solvent; wherein said formulation comprises:
about 240 g/L of 2-chloro-6-(trichloromethyl)pyridine;
about 63.08 weight percent of a dibasic ester;
about 1.5 weight percent of epoxidized linseed oil; and
about 0.8 weight percent nicotinamide.

12. A formulation, comprising:
about 324 g/L of 2-chloro-6-(trichloromethyl)pyridine;
about 26.02 weight percent of a dibasic ester;
about 2.04 weight percent of epoxidized linseed oil;
about 0.98 weight percent nicotinamide; and
about 39.02 weight percent cyclohexanone.

13. A formulation, comprising:
the formulation according to claim 12; and
at least one additional agricultural ingredient selected from the group consisting of: herbicides, insecticides, mitocides, fungicides, and fertilizers.

14. The formulation according to claim 13, wherein the agricultural ingredient is a fertilizer.

15. The formulation according to claim 14, wherein the fertilizer includes nitrogen.

16. A method for treating soil, comprising the steps of:
applying at least one of the formulation of claim 12 to at least one area selected from the area consisting of: the surface of a portion of soil, beneath the surface of a portion of soil, a portion of a plant, and a portion of a surface adjacent to a plant.

17. The method according to claim 16, wherein the applying step includes injecting the formulation into a portion of soil.

* * * * *